US012566189B2

(12) United States Patent
Hayashida et al.

(10) Patent No.: US 12,566,189 B2
(45) Date of Patent: Mar. 3, 2026

(54) AUTOMATIC ANALYZER AND INSERTION METHOD OF REACTION CONTAINER

(71) Applicant: Hitachi High-Tech Corporation, Tokyo (JP)

(72) Inventors: Norihiro Hayashida, Tokyo (JP); Yuya Matsuoka, Tokyo (JP); Eiichiro Takada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 699 days.

(21) Appl. No.: 17/923,685

(22) PCT Filed: Feb. 5, 2021

(86) PCT No.: PCT/JP2021/004449
§ 371 (c)(1),
(2) Date: Nov. 7, 2022

(87) PCT Pub. No.: WO2021/229874
PCT Pub. Date: Nov. 18, 2021

(65) Prior Publication Data
US 2023/0184797 A1 Jun. 15, 2023

(30) Foreign Application Priority Data

May 11, 2020 (JP) ................................. 2020-083219

(51) Int. Cl.
*G01N 35/02* (2006.01)
*G01N 35/10* (2006.01)
*G01N 35/04* (2006.01)

(52) U.S. Cl.
CPC ....... *G01N 35/026* (2013.01); *G01N 35/1002* (2013.01); *G01N 35/1011* (2013.01); *G01N 2035/0463* (2013.01)

(58) Field of Classification Search
CPC ........... G01N 35/1011; G01N 35/0099; G01N 35/04; G01N 35/1002; G01N 35/026;
(Continued)

(56) References Cited

U.S. PATENT DOCUMENTS 5,599,501 A 2/1997 Carey et al.
5,632,399 A * 5/1997 Palmieri ................ G01N 35/02
220/255

(Continued)

FOREIGN PATENT DOCUMENTS

JP 5-142234 A 6/1993
JP 6-510233 A 11/1994
(Continued)

OTHER PUBLICATIONS

International Search Report (PCT/ISA/210) issued in PCT Application No. PCT/JP2021/004449 dated Apr. 6, 2021 with English translation (five (5) pages).
(Continued)

*Primary Examiner* — Shogo Sasaki
(74) *Attorney, Agent, or Firm* — Crowell & Moring LLP

(57) ABSTRACT

To provide an automatic analyzer in which a reaction container can be smoothly inserted into a hole of an incubator. An automatic analyzer 100 analyzing a sample includes: an incubator 105 having a hole 202 into which a reaction container 114 containing a mixture of the sample and a reagent is to be inserted; and a transfer unit 109 configured to transfer an unused reaction container 114 to the incubator 105 and insert the reaction container 114 into the hole 202. A lubricating member 203 having a self-lubricating property is provided at an inlet port of the hole 202.

7 Claims, 11 Drawing Sheets

(58) Field of Classification Search
  CPC ................. G01N 35/025; G01N 35/00; G01N
            2035/0463; G01N 2035/0406; G01N
            2035/00277; G01N 2035/0446; G01N
                                2035/00356
  See application file for complete search history.

(56) References Cited

U.S. PATENT DOCUMENTS

| | | | | |
|---|---|---|---|---|
| 5,651,941 | A | 7/1997 | Stark et al. | |
| 5,976,896 | A * | 11/1999 | Kumar ................... | G01N 33/94 |
| | | | | 422/417 |
| 2003/0113233 | A1* | 6/2003 | Nanthakumar .... | G01N 35/1074 |
| | | | | 422/400 |
| 2005/0250210 | A1* | 11/2005 | Pilkington ................ | B01L 9/06 |
| | | | | 436/43 |
| 2008/0063573 | A1* | 3/2008 | Ammann ........... | G01N 35/0098 |
| | | | | 422/105 |
| 2008/0124720 | A1 | 5/2008 | Sowerby et al. | |
| 2009/0282932 | A1* | 11/2009 | Blackwell .......... | G01N 35/1002 |
| | | | | 73/863.21 |
| 2012/0024055 | A1* | 2/2012 | Knight ................... | G01F 23/263 |
| | | | | 73/304 C |
| 2013/0109082 | A1* | 5/2013 | Quinn ..................... | B01L 3/502 |
| | | | | 422/522 |
| 2014/0353157 | A1 | 12/2014 | Hoffmeyer et al. | |
| 2019/0331705 | A1 | 10/2019 | Luoma | |
| 2019/0376883 | A1 | 12/2019 | Yokoyama et al. | |
| 2020/0284860 | A1* | 9/2020 | Bangemann ......... | G01R 33/307 |
| 2022/0042902 | A1 | 2/2022 | Matsuoka et al. | |

FOREIGN PATENT DOCUMENTS

| | | | |
|---|---|---|---|
| JP | | 2008-521432 A | 6/2008 |
| JP | | 2015-534042 A | 11/2015 |
| WO | WO 2018/147029 | A1 | 8/2018 |
| WO | WO 2019/164904 | A1 | 8/2019 |
| WO | WO 2020/066165 | A1 | 4/2020 |

OTHER PUBLICATIONS

Japanese-language Written Opinion (PCT/ISA/237) issued in PCT Application No. PCT/JP2021/004449 dated Apr. 6, 2021 (four (4) pages).

Japanese-language International Preliminary Report on Patentability (PCT/IPEA/409) issued in PCT Application No. PCT/JP2021/004449 dated Dec. 21, 2021, including Annexes (eight (8) pages).

Hindi-language Office Action issued in issued in Indian Application No. 202217063831 dated Mar. 3, 2023 with English translation (five (5) pages).

Extended European Search Report issued in European Application No. 21802189.7 dated Apr. 19, 2024 (10 Pages).

\* cited by examiner

[FIG. 1]
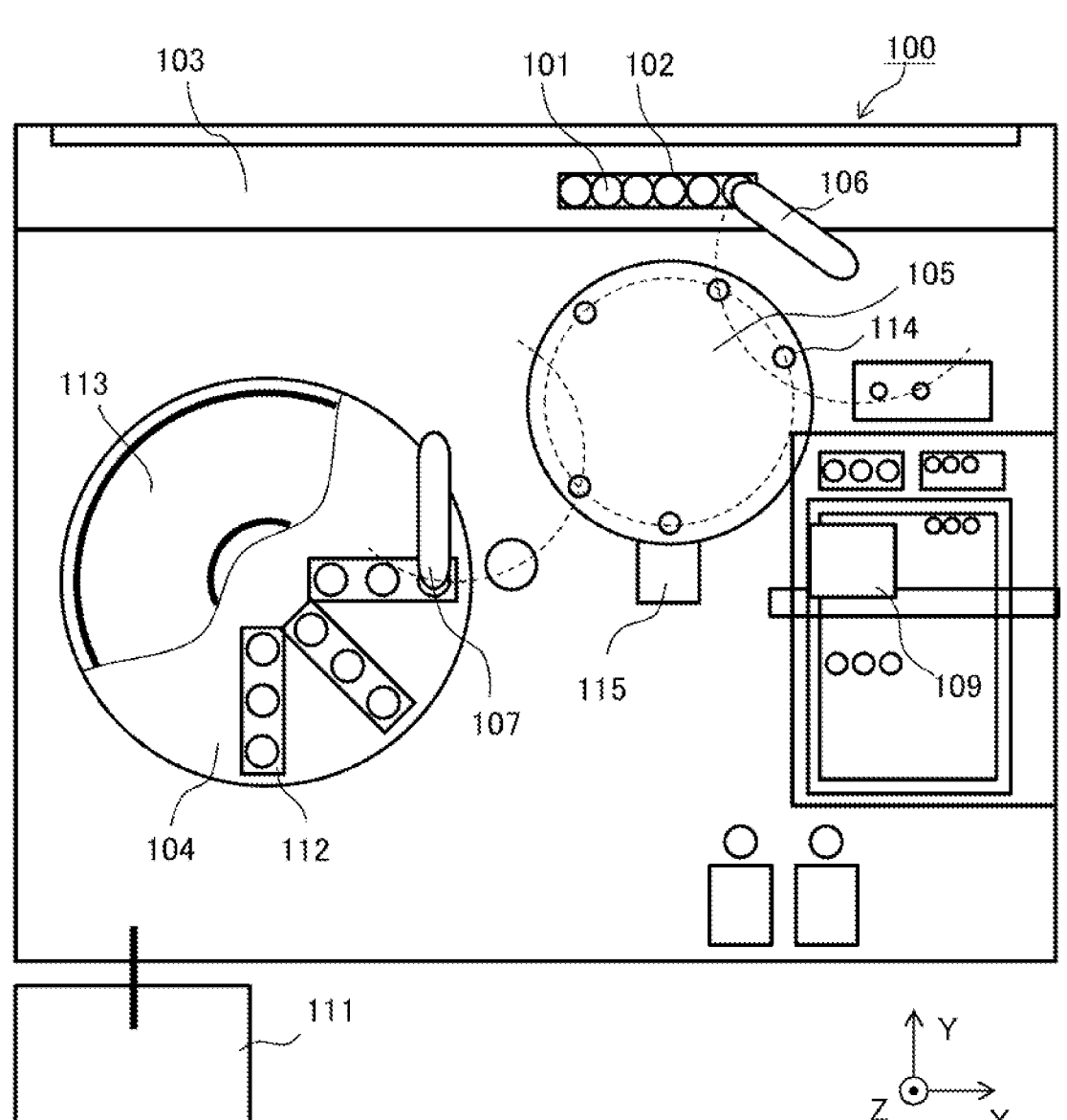

[FIG. 2]
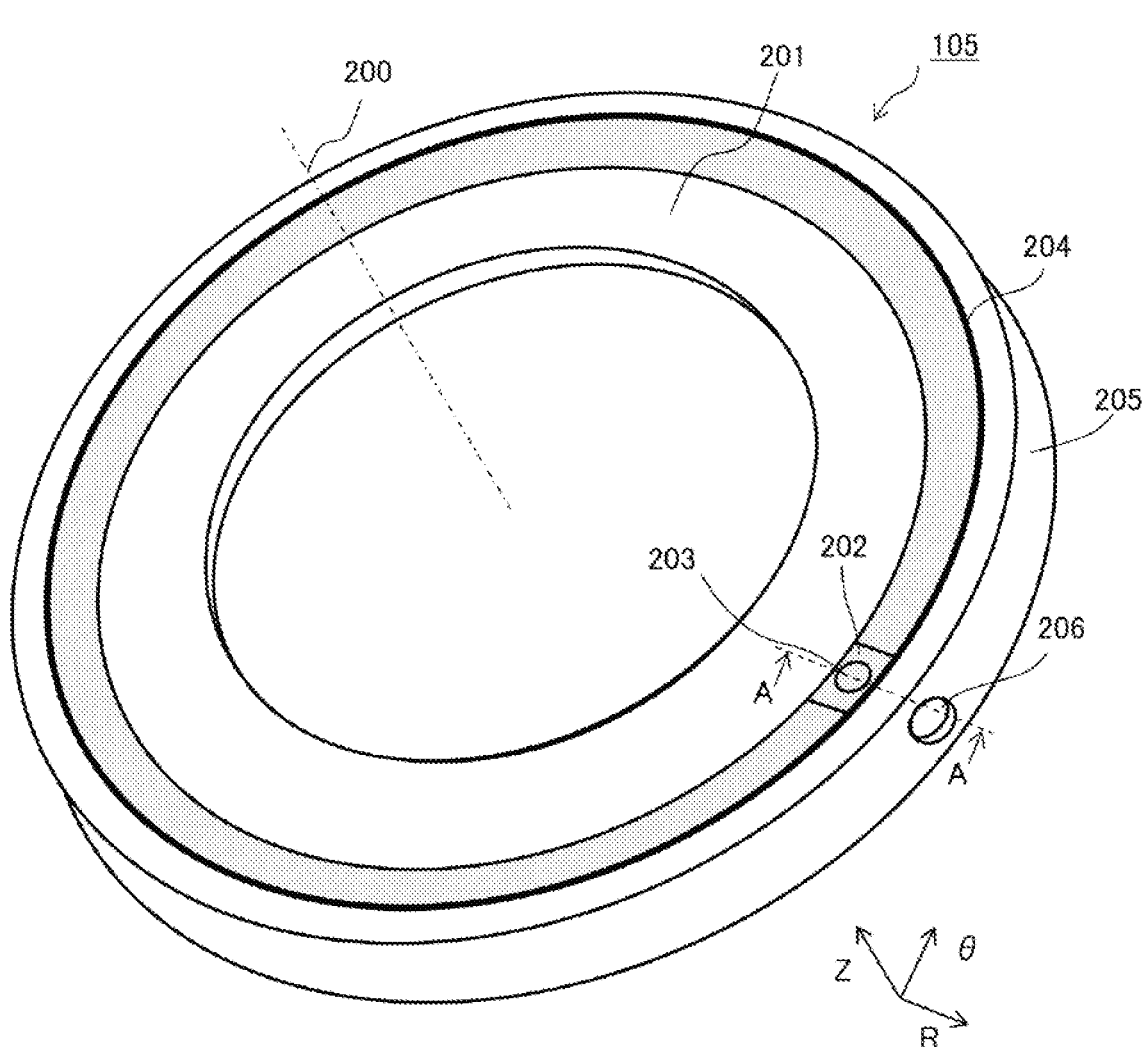

[FIG. 3]

[FIG. 4]
A-A CROSS SECTION
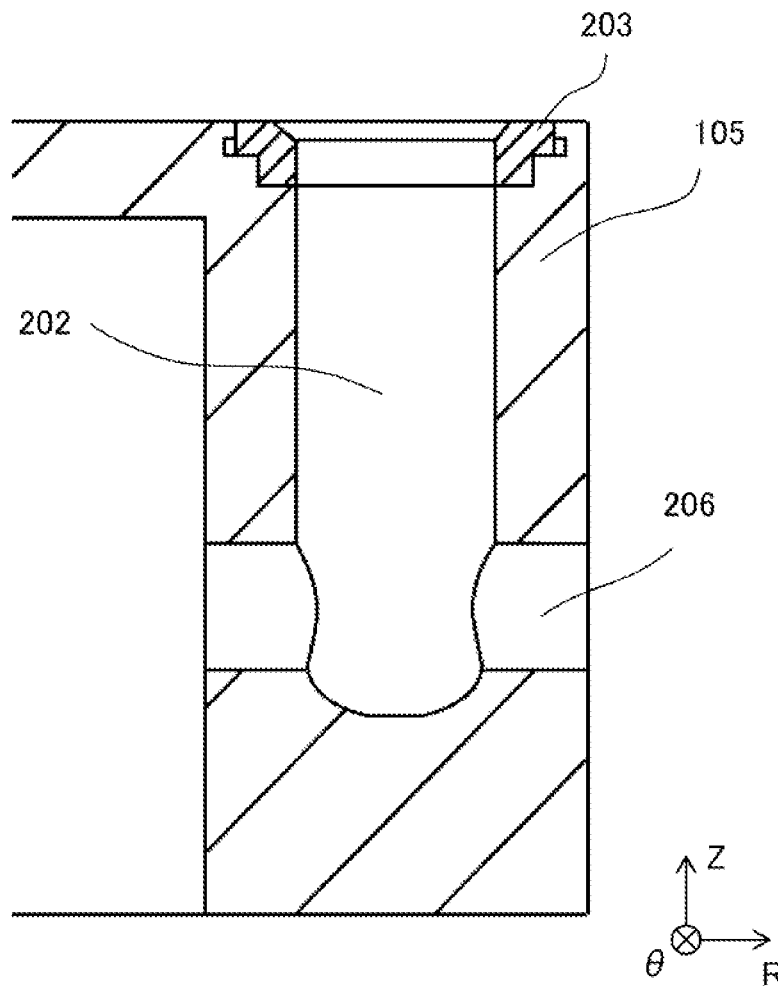

[FIG. 5]
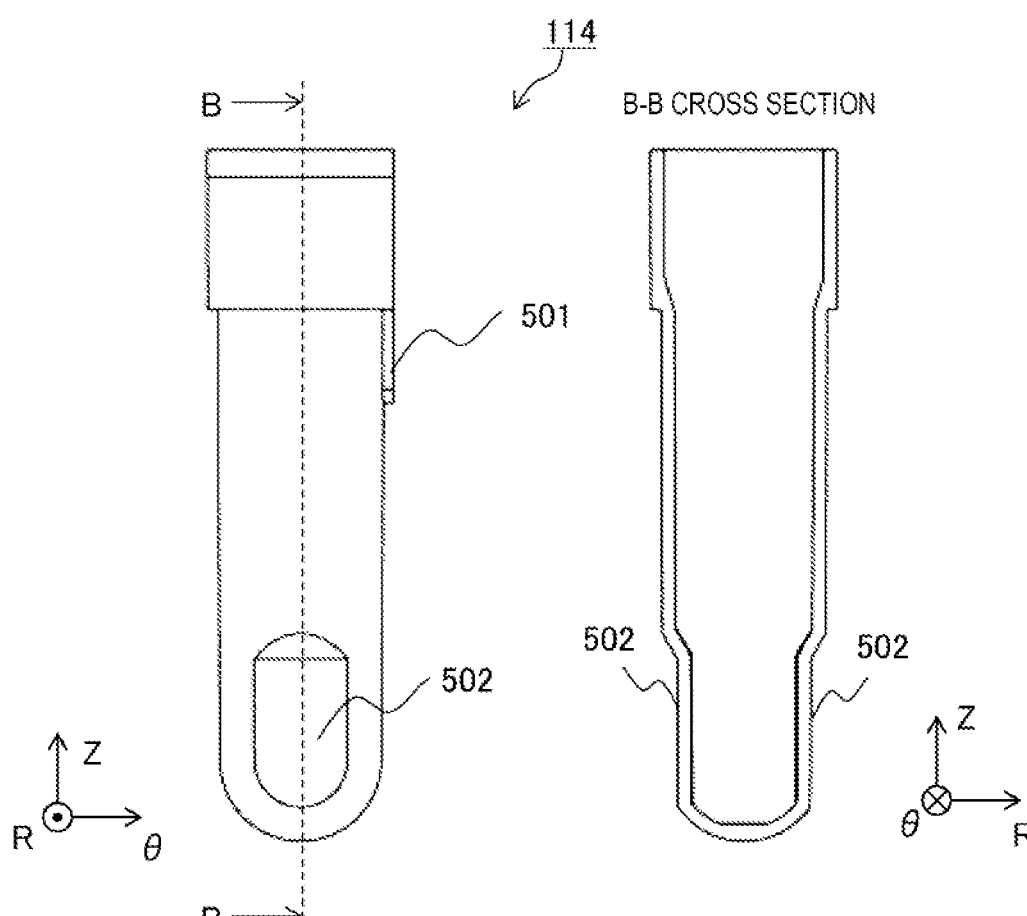

[FIG. 6]
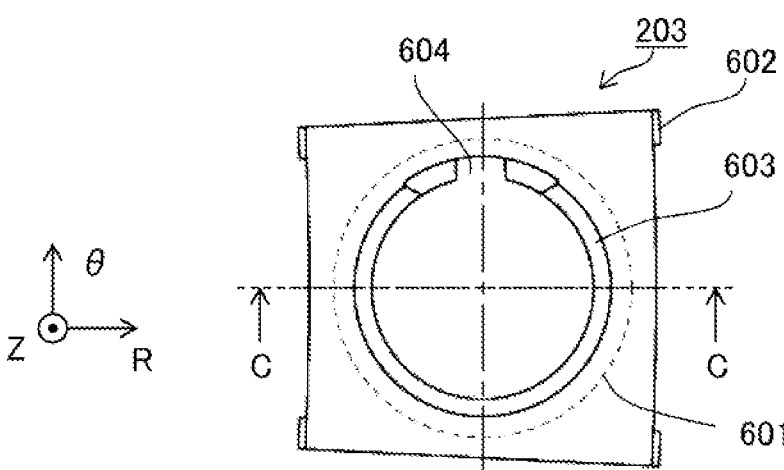
C-C CROSS SECTION
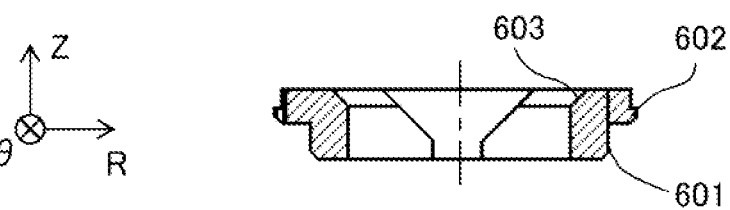
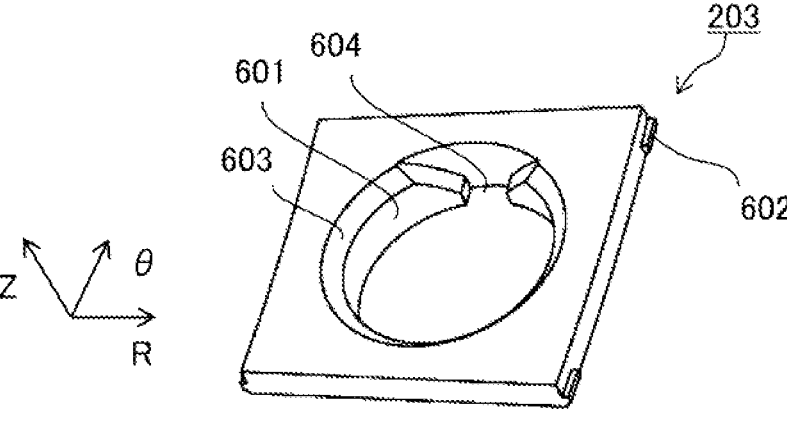

[FIG. 7]
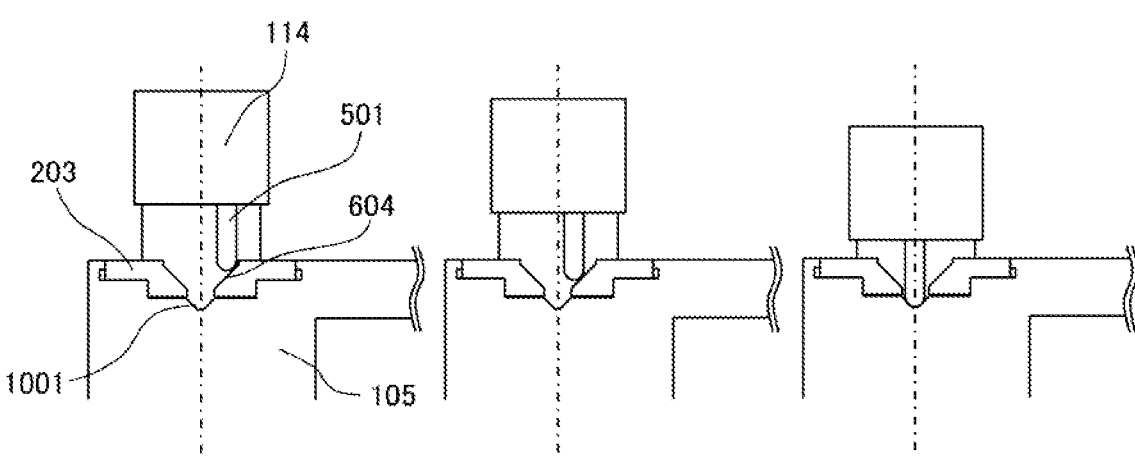

[FIG. 8]
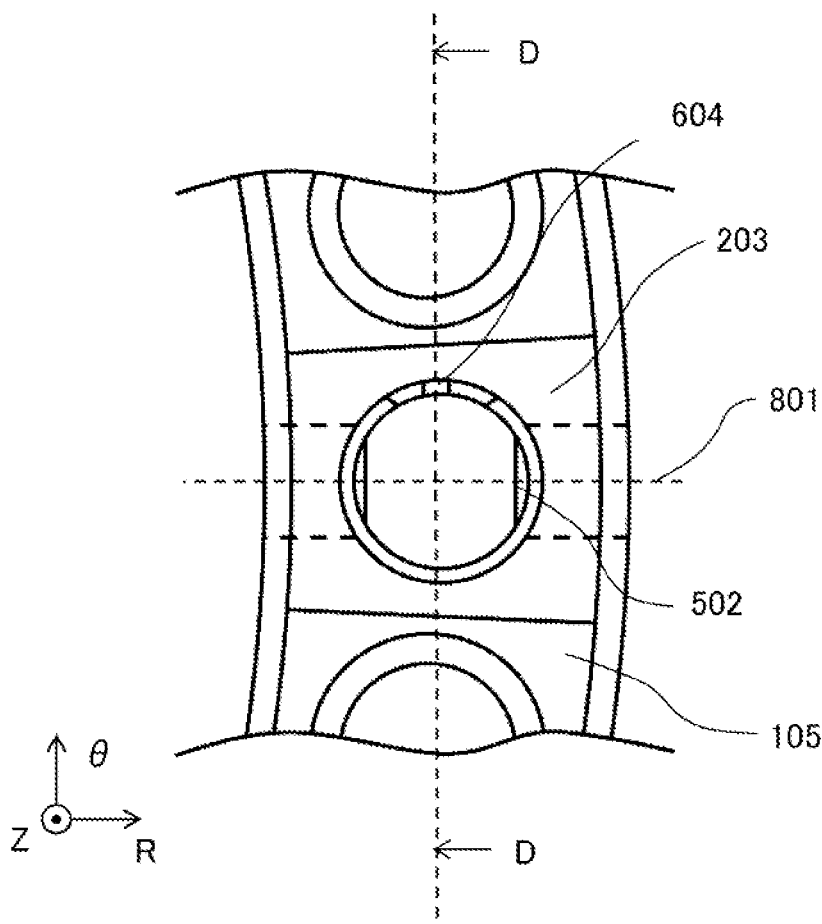

[FIG. 9]
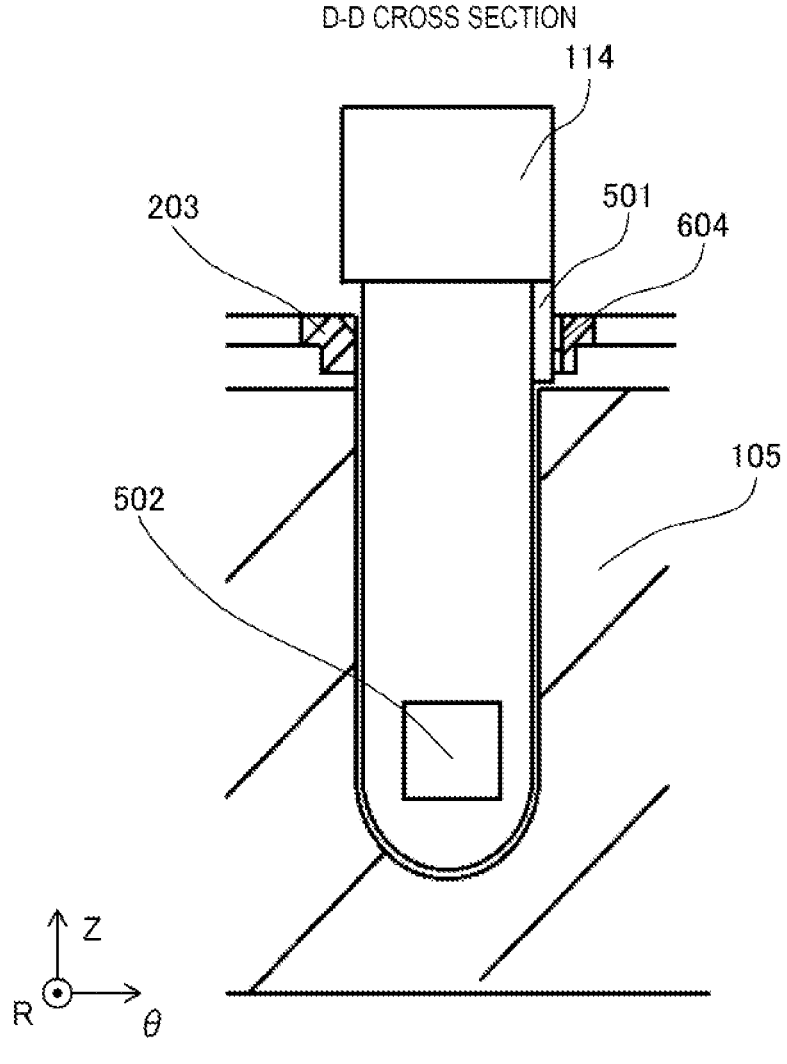
D-D CROSS SECTION

[FIG. 10]
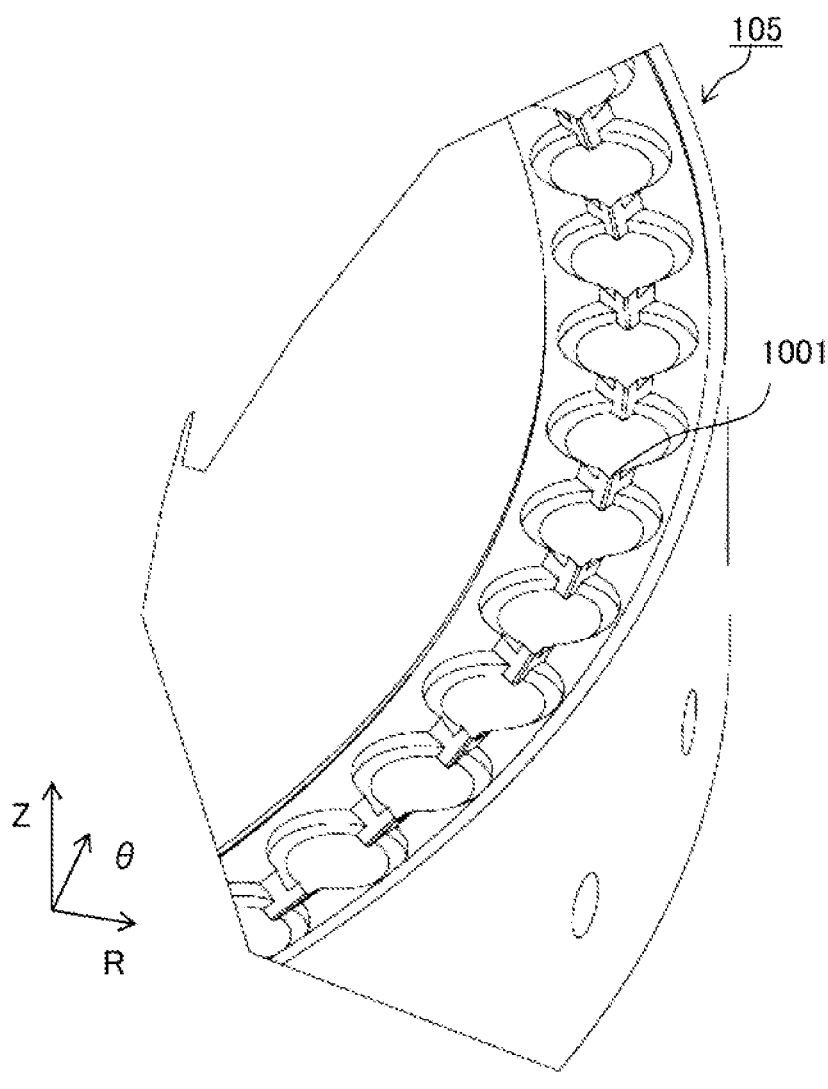

[FIG. 11]
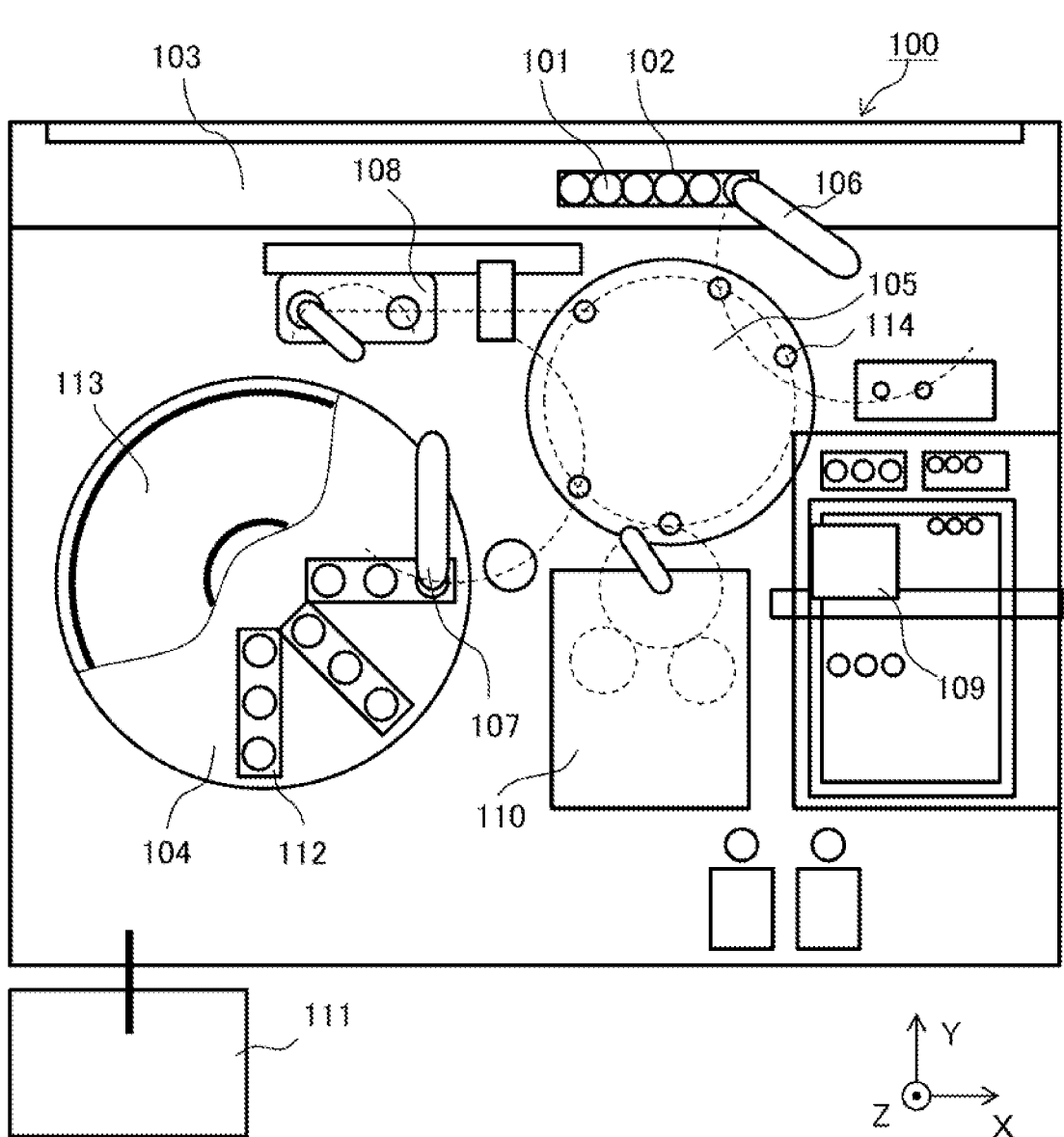

AUTOMATIC ANALYZER AND INSERTION METHOD OF REACTION CONTAINER

BACKGROUND ART

An automatic analyzer is a device that analyzes specific components included in a sample such as blood or urine supplied from a patient, and is used in hospitals and inspection facilities. Prior to analyzing specific components in a sample, in an incubator, a mixed solution mixed with a sample and a reagent is reacted at a predetermined temperature, close to a human temperature of 37° C., for example.

Patent Literature 1 discloses an insulation made of polyethylene is mounted on an incubator at places other than the vicinity of a hole into which a reaction vessel in a tapered shape is inserted.

CITATION LIST

Patent Literature

Patent Literature 1: International Publication No. WO2018/147029

SUMMARY OF INVENTION

Technical Problem

However, in Patent Literature 1, no consideration is paid to the insertion of a reaction vessel, specifically a reaction vessel in a tubular shape into a hole of the incubator. Although the reaction vessel in a tubular shape can reduce the liquid amount of a sample of the reaction vessel in a tapered shape, the resistance at the time of insertion into the hole of the incubator. The increase in resistance at the time of insertion sometimes makes the mounting of the reaction vessel into the incubator, and the processing performance of the automatic analyzer is sometimes reduced.

Therefore, it is an object of the present invention to provide an automatic analyzer that is capable of smoothly inserting a reaction vessel into the hole of the incubator.

Solution to Problem

In order to achieve the object, the present invention is an automatic analyzer, including an incubator having a hole into which a reaction vessel containing a mixture of a sample and a reagent is to be inserted, and a transfer unit configured to transfer an unused reaction vessel to the incubator and insert the reaction vessel into the hole. In the automatic analyzer, a lubricating member having a self-lubricating property is provided at an inlet port of the hole.

Advantageous Effects of Invention

According to the present invention, it is possible to provide an automatic analyzer that is capable of smoothly inserting a reaction vessel into the hole of the incubator.

BRIEF DESCRIPTION OF DRAWINGS

FIG. 1 is a plan view showing a schematic configuration of an example of an automatic analyzer for biochemical examination.

FIG. 2 is a perspective view showing an example of an incubator.

FIG. 3 is a diagram showing a state in which a reaction container is inserted into a hole.

FIG. 4 is a diagram showing an A-A cross section of FIG. 2.

FIG. 5 is a diagram showing an example of the reaction container.

FIG. 6 is a diagram showing an example of a lubricating member.

FIG. 7 is a diagram showing a state in which a protrusion is fitted into a guide groove.

FIG. 8 is an enlarged plan view of a portion where the lubricating member is attached.

FIG. 9 is a diagram showing a D-D cross section of FIG. 8.

FIG. 10 is a perspective view showing an example of the incubator from which the lubricating member is removed.

FIG. 11 is a plan view showing a schematic configuration of an example of an automatic analyzer for immunological examination.

DESCRIPTION OF EMBODIMENTS

In the following, preferred embodiments according to the present invention the automatic analyzer will be described with reference to the drawings. Note that in the following description and the accompanying drawings, the redundant description of components having the same functional configurations is omitted by assigning the same reference signs.

First Embodiment

Referring to FIG. 1, an example of the overall structure of an automatic analyzer 100 for biochemical testing will be described. The automatic analyzer 100 has a sample transport path 103, a reagent disk 104, a transfer unit 109, an incubator 105, a spectrophotometer 115, and a control unit 111. In the following, the components will be described. Note that the lateral direction in FIG. 1 is defined as an X-axis, the vertical direction is defined as a Y-axis, and the vertical direction that is a direction orthogonal to the paper surface is defined as a Z-axis.

The sample transport path 103 transports a sample rack 102 on which a plurality of sample containers 101 containing a sample is mounted to a position accessible by a sample dispensing unit 106. The sample contained in the sample container 101 is dispensed into a reaction vessel 114 retained in the incubator 105 by the sample dispensing unit 106.

The transfer unit 109 grasps and transfers the reaction vessel 114 or a dispensing chip, which is a consumable item disposed in a tray with a gripper. The reaction vessel 114 to be transferred from the tray to the incubator 105 using the transfer unit 109 is used for containing a mixed solution of the sample and a reagent is replaced in every analysis. That is, the transfer unit 109 transfers an unused reaction vessel 114 to the incubator 105.

The reagent disk 104 keeps a plurality of reagent containers 112 containing the reagent. In order to mitigate the degradation of the reagent, the inside of the reagent disk 104 is kept at a temperature lower than room temperature. Moreover, the reagent disk 104 is covered with a reagent disk cover 113. Note that in FIG. 1, in order to represent a disposition example of the reagent container 112, only a part of the reagent disk cover 113 is shown. The reagent contained in the reagent container 112 is dispensed into the reaction vessel 114 into which the sample is dispensed by the reagent dispensing unit 107.

The incubator 105 retains a plurality of reaction vessels 114 containing the mixed solution of the sample and the reagent, and is kept at a predetermined temperature of 37° C., for example, in order to react the mixed solution. The mixed solution is reacted for a predetermined time period in the process of retaining the reaction vessel 114 in the incubator 105 whose temperature is kept at a predetermined temperature, and thus the mixed solution is turned into a reaction solution used for analysis.

The spectrophotometer 115 measures the absorbance of the reaction solution in order to analyzes specific components included in the reaction solution contained in the reaction vessel 114. The spectrophotometer 115 is disposed adjacent to the incubator 105, and has a light source, a spectral element, and a photodetector. For the light source, a halogen lamp is used, for the spectral element, a diffraction grating is used, and for the photodetector, a photomultiplier tube, a photodiode, or the like is used. A light beam emitted from the light source is separated into measurement wavelengths by the spectral element, and then applied to the reaction solution contained in the reaction vessel 114, and is detected by the intensity of the light beam transmitted through the reaction solution. An absorbance $A_\lambda$ relating to a certain wavelength $\lambda$ is calculated by the following formula using an intensity $I_{\lambda,0}$ of a light beam applied to the reaction solution and the intensity of the light beam transmitted through the reaction solution $I_\lambda$.

$$A_\lambda = \log(I_{\lambda,0}/I_\lambda) \qquad \text{(Formula 1)}$$

Moreover, since the absorbance $A_\lambda$ is proportional to an optical path length L and a concentration C of a specific component included in the reaction solution, the following formula is held.

$$A_\lambda = \varepsilon \cdot L \cdot C \qquad \text{(Formula 2)}$$

Here, $\varepsilon$ is a proportionality constant determined for every type of specific component. That is, the concentration C of the specific component is calculated from the value of the absorbance $A_\lambda$ calculated from the intensity $I_\lambda$ of the transmitted light beam of the reaction solution and the optical path length L.

The control unit 111 is a device that controls the operation of the components, accepts inputs of data necessary for analyzes, displays or stores results of analysis, which is, for example, a computer.

Referring to FIG. 2, an exemplary configuration of the incubator 105 will be described. The incubator 105 in FIG. 2 has a board 201 in a ring shape that rotates at a predetermined angle every lapse of a predetermined time period at a central axis 200 as a rotation axis, a heater 204, and an insulation 205. In the following, the components will be described. Note that the radial direction of the board 201 is defined as an R axis, the circumferential direction is defined as a $\theta$ axis, and the vertical direction that is a direction in parallel with the central axis 200 is defined as a Z-axis.

The board 201 has a plurality of holes 202 into which reaction vessel 114 is inserted along the outer periphery. Note that in FIG. 2, in order to simplify the drawing, only one hole 202 is shown. The inlet ports of the individual holes 202 are provided with a lubricating member 203 that is a member having self lubricity. The self lubricity means that the coefficient of friction of the material itself is extremely small. The lubricating member 203 is a material having a coefficient of friction smaller than the coefficient of friction of at least the board 201, which is PTFE (Poly Tetra Fluoro-Ethylene), polyacetal, ultrahigh molecular polyethylene, monomer-cast nylon, and the like, for example. The lubricating member 203 is provided on the inlet port of the hole 202, and thus the reaction vessel 114 can be smoothly inserted into the hole 202.

Figure 3:
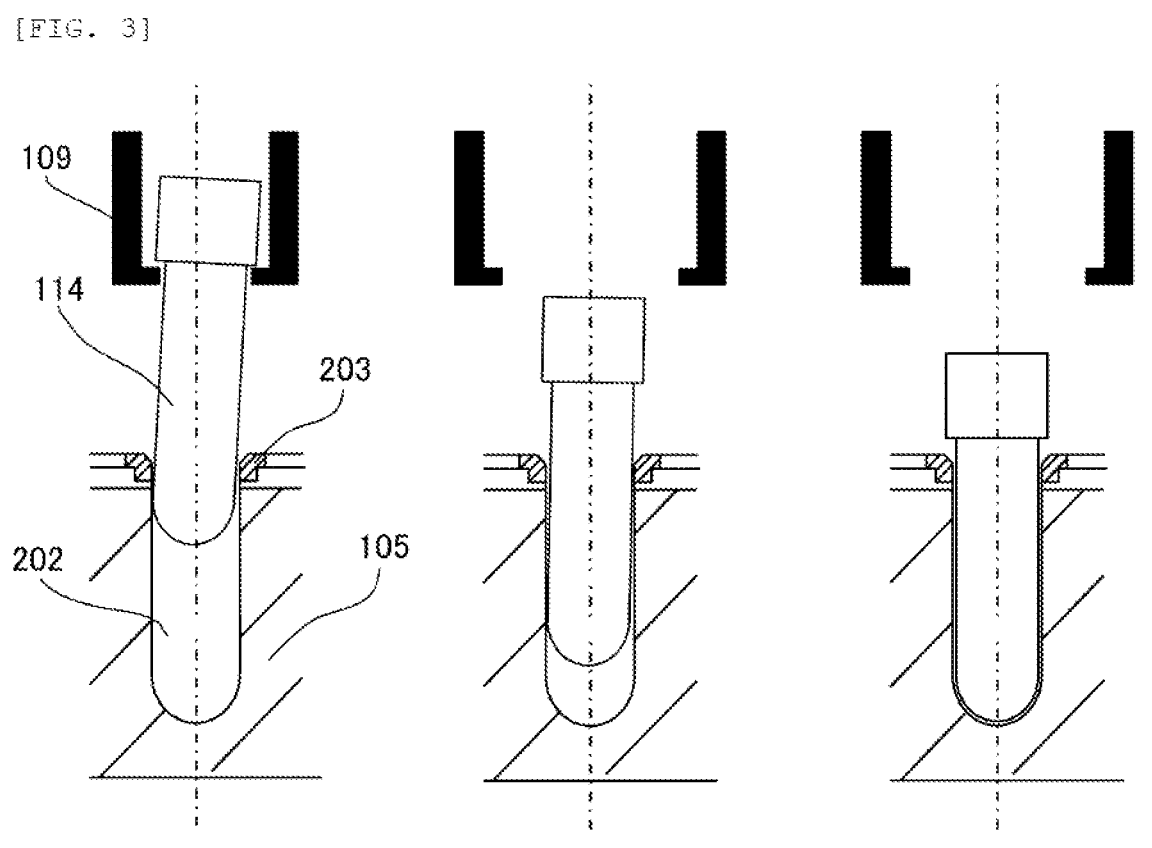

As shown in FIG. 3, even the case in which the reaction vessel 114 is obliquely inserted into the hole 202, smooth insertion is possible. desirably, the gripper of the transfer unit 109 releases the grasp of the reaction vessel after the reaction vessel is deeply pressed by a predetermined distance from the opening of the hole 202. It should be noted that although the gripper desirably vertically brings down the reaction vessel 114 from right above the hole 202, the grasp may be released after the reaction vessel 114 is intentionally brought into contact with the lubricating member 203.

The heater 204 is a hating resistor in a belt shape that is disposed so as to cover the side surface of the outer periphery of the board 201, and the supply of electric power is controlled based on the measured value of a thermometer, not shown, provided on the board 201. The insulation 205 is a material having a relatively low coefficient of thermal conductivity, and the insulation 205 is disposed so as to cover the outer periphery of the heater 204 and the bottom surface of the board 201. The board 201 is kept at a predetermined temperature by the heating of the heater 204 and the insulation of the insulation 205, the reaction of the mixed solution in the reaction vessel 114 inserted into the hole 202 progresses, and the reaction solution is generated.

On the side surface of the incubator 105, a photometric hole 206 is provided, and is used for measuring the absorbance of the reaction solution of the spectrophotometer 115. The photometric hole 206 may be provided for every hole 202 to be inserted into the reaction vessel 114, or may be provided at every several holes 202, for example, at every one hole 202.

Referring to FIG. 4, the position at which the lubricating member 203 is provided and the photometric hole 206 will be further described. Since the lubricating member 203 is a resin material such as PTFE, and has a relatively low coefficient of thermal conductivity, the lubricating member 203 is disposed on the inlet port of the hole 202 so as not to inhibit heat transfer from the board 201 to the reaction vessel 114. Specifically, the lubricating member 203 is preferably provided at a position higher than the liquid level of at least the mixed solution so as not to inhibit heat transfer of the mixed solution contained in the reaction vessel 114.

The photometric hole 206 is provided such that the inner periphery side communicates with the outer periphery side in the radial direction of the incubator 105 through the hole 202. That is, a light beam emitted from the light source and separated by the spectral element is applied to the reaction solution contained in the reaction vessel 114 through any one of the photometric holes 206, and the light beam transmitted through the reaction solution is detected by the photodetector through the other photometric hole 206.

Referring to FIG. 5, and example of the reaction vessel 114 will be described. FIG. 5 shows a side view of the reaction vessel 114 seen from the R direction and a B-B cross sectional view of the side view. The reaction vessel 114 in FIG. 5 has a protrusion 501 and two translucent surfaces 502, and places other than the places at which the protrusion 501 and the translucent surface 502 are provided are in a tubular shape. That is, most of the reaction vessel 114 is in a tubular shape.

The two translucent surfaces 502 are in parallel with each other, one is a surface into which the separated light beam enters, and the other is a surface through which the transmitted light beam of the reaction solution passes. Preferably, the reaction vessel 114 inserted into the hole 202 is disposed such that the translucent surface 502 faces the photometric hole 206. When the translucent surface 502 is disposed so as to face the photometric hole 206, a distance between the two translucent surfaces 502 is the optical path length L.

The protrusion 501 is a portion protruding from the side surface of the reaction vessel 114, and is provided so as to have a predetermined angle to the translucent surface 502 about the central axis of the reaction vessel 114 in parallel with each other the Z-axis. For example, the angle of the protrusion 501 to the translucent surface 502 is 0° such that the protrusion 501 is in parallel with each other the translucent surface 502.

When a certain optical path length L is reserved, the reaction vessel in a tapered shape an reduce the liquid amount of the sample necessary for analysis as the angle formed of the vertical axis and the side surface is reduced, and when the formed angle is at 0°, i.e., when the reaction vessel 114 is in a tubular shape, the minimum liquid amount is achieved. on the other hand, as the formed angle is reduced, the resistance when the reaction vessel 114 is inserted into the hole 202 of the incubator 105 increases. The increase in resistance at the time of insertion makes the mounting of the reaction vessel 114 on the incubator 105 is uncertain, sometimes leading to the degradation of the processing performance of the automatic analyzer 100. In the present embodiment, since the lubricating member 203 is disposed on the inlet port of the hole 202 of the incubator 105, the reaction vessel 114 is smoothly inserted into the hole 202, and it is possible to maintain the processing performance of the automatic analyzer 100.

Referring to FIG. 6, and example of the lubricating member 203 will be described. FIG. 6 shows a plan view of the lubricating member 203 seen from the Z-direction, a C-C cross sectional view of the plan view, and a perspective view of the lubricating member 203. The lubricating member 203 in FIG. 6 has an opening through which the reaction vessel 114 passes, a cylindrical portion 601, a claw 602, a chamfering portion 603, and a guide groove 604.

The cylindrical portion 601 is a portion having a tubular shape that is fit into the top end of the hole 202 in order to position the lubricating member 203 to the hole 202. That is, the outer diameter of the cylindrical portion 601 nearly matches the inner diameter of the top end of the hole 202.

The claw 602 is a portion that engages with the incubator 105 in order to prevent the lubricating member 203 having self lubricity from falling off from the incubator 105. That is, since there is the case in which the lubricating member 203 that is slippery to the incubator 105 falls off even though the reaction vessel 114 slightly touches the lubricating member 203, the incubator 105 engages with the claw 602, and thus the lubricating member 203 is prevented from falling off.

The chamfering portion 603 is an inclined plane provided on the edge of the opening of the lubricating member 203 whose side of the hole 202 is low, in order to mitigate the resistance when the reaction vessel 114 is inserted into the lubricating member 203. Note that since the coefficient of friction of the lubricating member 203 having self lubricity is extremely small, the chamfering portion 603 does not necessarily have to be provided.

Next, the directional portion will be described. The directional portion represents a site having a function that directs the translucent surface 502 of the reaction vessel 114 to a predetermined direction.

The guide groove 604 as an example of the directional portion is a groove having a function of facing the translucent surface 502 to the photometric hole 206, into which the protrusion 501 is fit. That is, in the case in which the angle of the protrusion 501 to the translucent surface 502 is 0°, the guide groove 604 is provided along the circumferential direction of the incubator 105. The guide groove 604 has a Y-groove shape. Even though the protrusion 501 is displaced more or less to the guide groove 604, the displacement is corrected along the Y-groove as shown in FIG. 7, and the positioning accuracy of the reaction vessel 114 is reserved. Note that when the translucent surface 502 can be directed to the direction of the photometric hole 206, the directional portion is not limited to the guide groove 604. For example, the site corresponding to the guide groove 604 may be formed in a projecting shape, and the site corresponding to the protrusion 501 may be formed in a recessed shape.

Referring to FIGS. 8 and 9, the reaction vessel 114 inserted into the incubator 105 mounted on the lubricating member 203 will be described. Note that the angle of the protrusion 501 to the translucent surface 502 of the reaction vessel 114 is 0°, and the guide groove 604 of the lubricating member 203 is provided along the circumferential direction of the incubator 105. The protrusion 501 of the reaction vessel 114 is fit into the guide groove 604 of the lubricating member 203, the translucent surface 502 of the reaction vessel 114 then faces the photometric hole 206, and becomes vertical to an optical path axis 801 of the spectrophotometer 115.

Referring to FIG. 10, an example of the incubator 105 from which the lubricating member 203 is removed will be described. The incubator 105 in FIG. 10 has an inter-hole groove 1001 along the circumferential direction between the adjacent holes 202. The inter-hole groove 1001 is provided in parallel with the guide groove 604 of the lubricating member 203, and into which the protrusion 501 of the reaction vessel 114 is fit. The protrusion 501 of the reaction vessel 114 is fit into the inter-hole groove 1001 as well as into the guide groove 604 to increase the contact area of the protrusion 501, leading to resistance to rotation of the reaction vessel 114, and the translucent surface 502 is easily vertically aligned with the optical path axis 801 of the spectrophotometer 115. Moreover, since the inter-hole groove 1001 is provided concentrically with the board 201 of the incubator 105.

As described above, according to the present embodiment, since the lubricating member 203 having self lubricity is provided at the inlet port of the hole 202 of the incubator 105, the reaction vessel 114 is smoothly inserted into the hole 202. Such smooth insertion surely mounts the reaction vessel 114 on the incubator 105, and thus it is possible to maintain the processing performance of the automatic analyzer 100.

Second Embodiment

In the first embodiment, the automatic analyzer 100 for biochemical testing has been described. In the present embodiment, an automatic analyzer 100 for immunologic testing using antigen antibody reactions shown in FIG. 11 will be described. Note that differences from the first embodiment are in that configurations involved in analysis and a pre-wash unit 108 and an analysis unit 110 are provided instead of the spectrophotometer 115.

The pre-wash unit 108 is a device that separates components unnecessary for analysis from a reaction solution. In the present embodiment, a reagent including magnetic fine particles attached with an antibody is used, and an antigen, which is a measured substance in a sample, bonds with the antibody attached to the magnetic fine particles by an immune reaction in an incubator 105. A reaction vessel 114 containing the reaction solution after the immune reaction is transferred to the pre-wash unit 108, and a component that does not bond with the magnetic fine particles, i.e., a component unnecessary for analysis is separated using a magnetic field. The reaction vessel 114 in which the unnecessary component is separated is returned to the incubator 105, transported to a position at which the analysis unit 110 is accessible by the rotation of the incubator 105, and then transferred to the analysis unit 110.

The analysis unit 110 analyzes the reaction solution from which unnecessary components contained in the transferred reaction vessel 114 is separated. The analysis unit 110 has a light source, a spectral element, and a photodetector, and has a function that adjusts temperatures in order to maintain the reproducibility of analysis. The reaction vessel 114 containing the reaction solution to be analyzed is transferred from the incubator 105 to the analysis unit 110, and then analyzed by the analysis unit 110.

Also in the incubator 105 of the present embodiment, since a lubricating member 203 having self lubricity is provided at the inlet port of a hole 202, the reaction vessel 114 is smoothly inserted into the hole 202. Note that the incubator 105 of the present embodiment may include or not include a photometric hole 206.

Third Embodiment

In the first embodiment, a case is described in which only one guide groove 604 as a directional portion is provided. In the present embodiment, a case in which will be described a plurality of guide grooves 604 is provided.

For example, in the case in which two guide grooves 604 are provided, two protrusions 501 may be provided. In this case, providing two fitting positions further improve positioning accuracy. The two guide grooves 604 and the two protrusions 501 may be provided at opposite positions, or may be provided with a given angle difference. Also in regard to shapes, the first protrusion and the second protrusion may have different shapes. To the two guide grooves, one protrusion 501 may be provided, and the numbers of the guide grooves 604 and the protrusions 501 do not necessarily have to be the same. Furthermore, the number of the guide grooves 604 is not limited in the range in which the guide grooves 604 can be provided at the hole 202, as long as the numbers of the guide grooves 604 is equal to or more than the number of the protrusions 501.

As described above, a plurality of embodiments according to the present invention is described. The present invention is not limited to the foregoing embodiments, and may be modified in the scope not deviating from the gist of the invention. For example, the shape of the incubator 105 may be in a ring shape as shown in FIG. 2, or may be in a shape in which the reaction vessels 114 are linearly arranged. Moreover, a plurality of components disclosed in the foregoing embodiments may be appropriately combined. Furthermore, some components may be removed from all the components shown in the foregoing embodiments.

REFERENCE SIGN LIST

101: sample container
102: sample rack
103: sample transport path
104: reagent disk

105: incubator
106: sample dispensing unit
107: reagent dispensing unit
108: pre-wash unit
109: transfer unit
110: analysis unit
111: control unit
112: reagent container
113: reagent disk cover
114: reaction container
115: spectrophotometer
200: central axis
201: board
202: hole
203: lubricating member
204: heater
205: insulation
206: photometric hole
501: protrusion
502: translucent surface
601: cylindrical portion
602: claw
603: chamfering portion
604: guide groove
801: optical path axis
1001: inter-hole groove

The invention claimed is:

1. An automatic analyzer, comprising:
an incubator having a hole into which a reaction vessel containing a mixture of a sample and a reagent is to be inserted; and
a transfer unit configured to transfer an unused reaction vessel to the incubator and insert the reaction vessel into the hole, wherein
a lubricating member having a self-lubricating property is provided at an inlet port of the hole, and
the lubricating member is provided at a position higher than a liquid level of the mixture contained in the reaction vessel.

2. The automatic analyzer according to claim 1, wherein the reaction vessel has a translucent surface which is a flat surface through which light for analysis is to be transmitted, and
the lubricating member has a directional portion that directs the translucent surface in a predetermined direction.

3. The automatic analyzer according to claim 2, wherein the reaction vessel further has a protrusion that protrudes from a side surface, and
the directional portion has a guide groove which is a groove that fits with the protrusion.

4. The automatic analyzer according to claim 3, wherein the incubator has a groove parallel to the guide groove.

5. The automatic analyzer according to claim 1, wherein a material of the lubricating member is any one of PTFE, polyacetal, ultra-high molecular weight polyethylene, or monomer cast nylon.

6. The automatic analyzer according to claim 1, wherein the lubricating member has a claw that meshes with the incubator.

7. The automatic analyzer according to claim 1, wherein the lubricating member has a chamfering portion which is an inclined surface that is lower toward the hole.

* * * * *